United States Patent
Chiang et al.

(10) Patent No.: US 7,393,518 B2
(45) Date of Patent: Jul. 1, 2008

(54) ZIRCONIA SOL AND METHOD FOR PREPARING THE SAME

(75) Inventors: Anthony S. T. Chiang, Taoyuan County (TW); Xiu-Sheng Yang, Taipei (TW); Chien-Wei Chen, Miaoli (TW)

(73) Assignee: National Central University, Taoyuan (TW)

( * ) Notice: Subject to any disclaimer, the term of this patent is extended or adjusted under 35 U.S.C. 154(b) by 846 days.

(21) Appl. No.: 10/708,801

(22) Filed: Mar. 26, 2004

(65) Prior Publication Data
US 2004/0192790 A1    Sep. 30, 2004

(30) Foreign Application Priority Data
Mar. 27, 2003    (TW) .............................. 92106899 A

(51) Int. Cl.
*C01G 25/02*    (2006.01)
(52) U.S. Cl. ........................................ 423/608
(58) Field of Classification Search .............. 423/698, 423/608
See application file for complete search history.

(56) References Cited

U.S. PATENT DOCUMENTS

| | | | | |
|---|---|---|---|---|
| 2,984,628 A | * | 5/1961 | Alexander et al. ............ 516/90 |
| 3,518,050 A | * | 6/1970 | Woodhead .................. 423/397 |
| 4,612,138 A | * | 9/1986 | Keiser ........................ 516/88 |
| 4,619,817 A | * | 10/1986 | Stambaugh et al. ......... 423/266 |
| 4,784,794 A | * | 11/1988 | Kato ............................ 516/90 |
| 5,223,176 A | * | 6/1993 | Obitsu et al. .................. 516/90 |
| 5,234,870 A | * | 8/1993 | Osaka et al. .................. 501/12 |
| 5,238,625 A | * | 8/1993 | Sakurai et al. .............. 264/621 |
| 5,470,910 A | * | 11/1995 | Spanhel et al. .............. 524/785 |
| 5,643,497 A | * | 7/1997 | Kaga et al. .................... 516/90 |
| 6,376,590 B2 | * | 4/2002 | Kolb et al. .................. 524/413 |
| 6,403,161 B1 | * | 6/2002 | Lobmann et al. ......... 427/376.2 |

FOREIGN PATENT DOCUMENTS

JP    01076919 A  *  3/1989
JP    01079015 A  *  3/1989

OTHER PUBLICATIONS

Gang Xu, Yawen Zhang, Chunsheng Liao, Chunhua Yan, Homogeneous precipitation synthesis and electrical properties of scandia stabilized zirconia, 2002, Solid State Communications, 121, 45-49.*
J.A. Wang, M.A. Valenzuela, J. Salmones, A. Vasquez, A. Garcia-Ruiz, X. Bokhimi, Comparative study of nanocrystalline zirconia prepared by precipitation and sol-gel methods, 2001, Catalysis Today, 68, 21-30.*
KT McAloon (ICI Ltd.), Novel Diaphragm Materials, 1976, Research Disclosure Journal, 14567, 1-3.*
T. Settu, R. Gobinathan, Synthesis and Characterization of Y2O3-ZrO2 and Y2O3-CeO2-ZrO2 Precursor Powders, 1996, Journal of the European Ceramic Society, 16, 1309-1318.*

* cited by examiner

*Primary Examiner*—Timothy C. Vanoy
*Assistant Examiner*—Serena L Hanor
(74) *Attorney, Agent, or Firm*—Jianq Chyun IP Office

(57) ABSTRACT

A zirconia sol having zirconia crystals with an average primary particle size less than 20 nm is provided, wherein more than 90% of the zirconia crystals exist in the form of tetragonal and cubic crystal lattice structures. The zirconia sol has a transmittance more than 70% when the amount of the zirconia crystals in the zirconia sol is about 20 wt %.

22 Claims, 1 Drawing Sheet

ZIRCONIA SOL AND METHOD FOR PREPARING THE SAME

CROSS REFERENCE TO RELATED APPLICATIONS

This application claims the priority benefit of Taiwan application Ser. No. 92106899, filed on Mar. 27, 2003.

BACKGROUND OF INVENTION

1. Field of the Invention

This invention relates in general to a metal oxide nanoparticle sol and a method for preparing the same. More particularly, the invention relates to a zirconia nanocrystal sol and a method for preparing the same.

2. Description of the Related Art

The incorporation of zirconia nanoparticles into organic matrix materials (e.g., polymers) can increase the refractive index of optically transparent materials. The degree to which the refractive index of the organic matrix may be increased is a function of the loading limit of the nanoparticles in the organic matrix and the refractive index of the zirconia nanoparticles.

The nature of the zirconia (e.g., crystallinity, crystal structure, particle size and degree of primary particle association) governs the optical transmission, refractive index and the loading limit of the nanoparticles in an organic polymer. For a material to remain optical transparent after the incorporation of nanoparticles, the size of the nanoparticles has to be smaller than ¼ of the wavelength of the incident light, so that light is not scattered. Therefore the requirement of transparency posts an upper limit to the size of the primary and the associated particles. To increase the refractive index of the matrix, the refractive index of the incorporated nanoparticles must be higher than the matrix. In this respect, crystalline zirconia has a higher reflective index than non-crystalline zirconia, and is thus preferred. The refractive index of the matrix can be increased substantially if the loading of zirconia is high. However, the loading limit of a zirconia in a polymer is a function of both particle association and particle size. As particle size increases and/or the association between particles increases, the loading limit of the zirconia in a polymer decreases. Therefore, a method for preparing a sol containing nano-crystalline zirconia without association or having only weak association is important and necessary.

A stable sol containing non- or weakly-associated zirconia nanocrystals is in general transparent to visible light. However, the pH range where the sol remains stable should be as close to neutral condition as possible, preferably in the range of pH 6~9, for easier application in various fields.

In a prior art, U.S. Pat. No. 4,784,794, a method of preparing a translucent zirconia sol by treating zirconium chloride at 130° C. or higher is disclosed, but the pH value of the prepared product is lower than 7. Additionally, U.S. Pat. No. 6,376,590 discloses a method of preparing a zirconia sol having high dispersing zirconia crystals by using a zirconium salt solution containing polyether or an organic acid having ether group therein as the starting material. However, the method requires high (140~250° C.) temperature and the pH value of the prepared product is lower than 7. Since the process temperature described in the above methods would require the employment of a high-pressure autoclave, a low temperature process for the preparation of zirconia sol is needed.

SUMMARY OF INVENTION

Accordingly, an objective of the present invention is to provide a zirconia sol and a method of preparing the same having zirconia nano-crystals that are not associated together or have weak interaction there-between.

Another objective of the present invention is to provide a zirconia sol and a method of preparing the same for obtaining a zirconia sol comprising zirconia crystals having an average primary particle size less than 20 nm.

Another objective of the present invention is to provide a zirconia sol and a method of preparing the same for obtaining a neutral zirconia sol.

Another objective of the present invention is to provide a zirconia sol and a method of preparing the same for preparing the zirconia sol under lower temperature.

The present invention provides a zirconia sol comprising zirconia crystals having an average primary particles size less than 20 nm, wherein more than 90% of the zirconia crystals are in the form of tetragonal and cubic crystal lattice structures, and the zirconia sol has a transmittance more than 70% when the amount of the zirconia crystals in the zirconia sol is about 20 wt %.

The present invention discloses a method of preparing a zirconia sol comprising providing a first solution containing an inorganic zirconium salt and an organic acid therein. The first solution is mixed with a buffer solution to obtain a sol, wherein the buffer solution contains an organic amine. The sol is then heated, at a lower temperature than previous methods, to obtain a product, and then the product is conditioned to form an acid mud. Thereafter, the acid mud is conditioned to form a neutral zirconia sol.

The zirconia sol of the present invention comprises of zirconia crystals having an avenge primary particle size less than 20 nm, without or with only weak association, and is therefore transparent. The average transmittance of visible light can be as high as 70% at a solid content of 20%. The zirconia sol of the present invention is further characterized by a neutral pH value and a lower preparation temperature.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
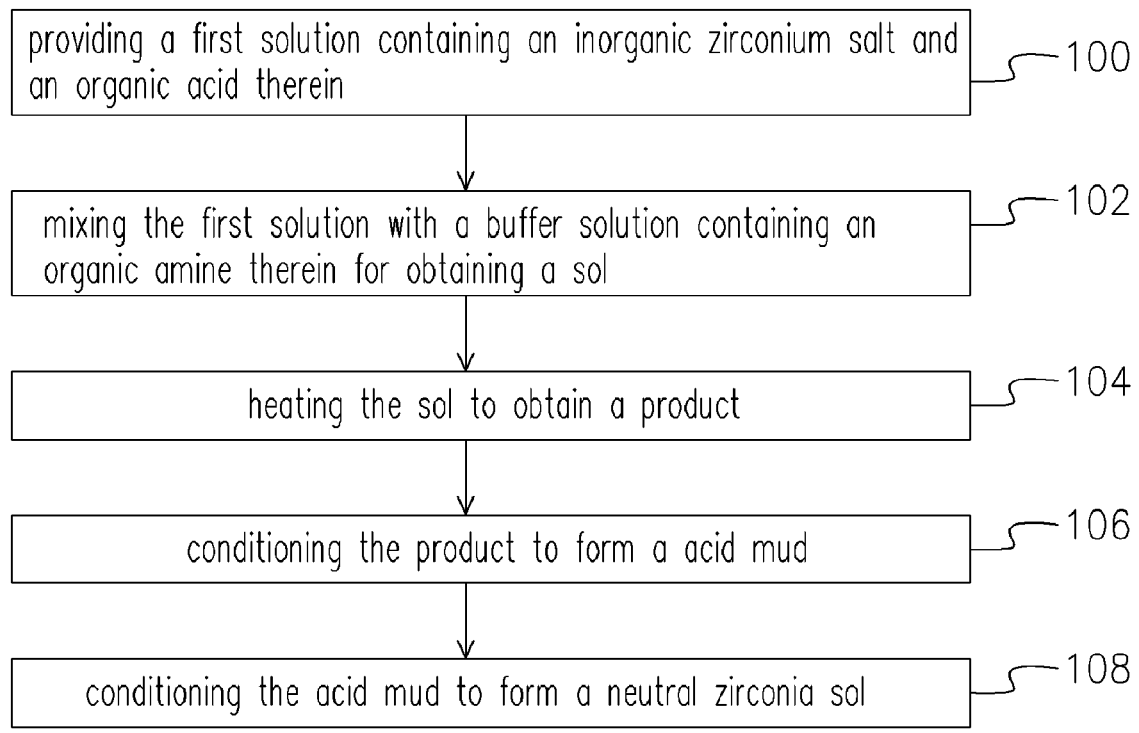
FIG. 1 is a flow chart of a method of preparing a zirconia sol according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a flow chart of a method of preparing a zirconia sol according to an embodiment of the present invention. Referring to FIG. 1, in step 100, a first solution containing an inorganic zirconium salt and an organic acid therein is provided, wherein the amount of the zirconium salt in the first solution is about 2~4 mol/L. The zirconium salt in the first solution is, far example, zirconium chloride, zirconium nitrate, zirconyl hydrochloride or other suitable inorganic zirconium salt. The organic acid and the zirconium ions in the first solution have a molar ratio between 0.1~0.25. The organic acid is, for example, monoacid such as formic acid, acetic acid, propionic acid, acrylic acid, methacrylic acid, benzoic acid, salicylic acid; dibasic acid such as tartaric acid; and tribasic acid such as citric acid.

Thereafter, in step 102, the first solution is mixed with a buffer solution containing an organic amine therein to obtain a sol, wherein the organic amine is, for example, trimethylamine, triethylamine, triethanolamine and tripropoylamine.

The organic amine in the buffer solution and the zirconium ions in the first solution have a molar ratio between 0.1~0.2. The buffer solution further contains ammonium carbonate and has a pH value about 10. The step of mixing the first solution with the buffer solution further includes dosing of an inorganic base into the buffer solution for controlling the pH value of the buffer solution to maintain the resultant pH value at about 10, wherein the variation of the pH value of the buffer solution is controlled not exceeding the variation range of ±0.5, and the temperature variation of the buffer solution is controlled not exceeding the variation range of ±10° C. In the embodiment, the pH value of the buffer solution is controlled by controlling the dosing speed of the inorganic base and the first solution into the buffer solution. After the first solution is mixed with the buffer solution to obtain the sol, the pH value of the sol is regulated between 10~12.

In step 104, the sol is heated to obtain a product. The heating of the sol is conducted at a temperature of about 90~120° C. for a duration of about 8~24 hours. The product obtained after the heating step is zirconia crystals having an average primary particle size less than 20 nm, that is, for example, with primary particle size ranging between 7~20 nm, and the zirconia crystals exist in the form of tetragonal and cubic crystal lattice structures. After the sol is heated to obtain the product, the product is further washed and filtered to remove chloride ions.

In step 106, adjusting the pH of the product to form an acidic slurry and the acidic slurry has a pH value lower than 3. In the embodiment, the product is adjusted to form the acidic slurry by, for example, an organic acid an organic dispersant, wherein the amount of the organic dispersant in the zirconia sol is about 10 wt %~15 wt % based on the solid weight.

In step 108, adjust the pH of the acidic slurry to form a neutral zirconia sol, and the neutral zirconia sol has a pH value between 5~10.

After obtaining the neutral zirconia sol, the neutral zirconia sol is dried to obtain dry neutral zirconia sol powder. The neutral sol can be dried, for example, by using a vacuum concentrating apparatus or an evaporating apparatus. In addition, after obtaining the dry neutral zirconia sol powder, the powder can be further dispersed in a solvent to form a transparent dispersion sol. The solvent can be, for example, water, a polar solvent such as ethanol and ethylene glycol and a mixed solvent thereof.

Because the zirconia sol of the present invention comprises zirconia crystals having an average primary particle size less than 20 nm, not only the transmittance or reflective index of the zirconia sol can be improved, but also a neutral zirconia sol can be obtained. Moreover, the preparing temperature of the present invention is lower than conventional methods.

It will be apparent to those skilled in the art that various modifications and variations can be made to the structure of the present invention without departing from the scope or spirit of the invention. In view of the foregoing descriptions, it is intended that the present invention cover modifications and variations of this invention provided they fall within the scope of the following claims and their equivalents.

The invention claimed is:

1. A method of preparing a zirconia sol, comprising:
providing a first solution containing an inorganic zirconium salt and an organic acid therein, wherein the organic acid is propionic acid, acrylic acid, or methacrylic acid;
mixing the first solution with a buffer solution containing an organic amine therein for obtaining a sol, wherein the organic amine is trimethanolamine, triethanolamine or tripropanolamine;
heating the sol to obtain a product;
adjusting the pH of the product to form an acidic slurry, wherein the acidic slurry has a pH value less than 3; and
adjusting the pH of the acidic slurry to form a neutral zirconia sol having a pH value between 5~10.

2. The method according to claim 1, wherein after the step of mixing the first solution with the buffer solution, further comprising regulating the pH value of the sol between 10~12.

3. The method according to claim 1, wherein during the step of mixing the first solution with the buffer solution, further comprising a step of adding an inorganic base into the buffer solution.

4. The method according to claim 3, wherein when mixing the first solution with the buffer solution and adding the inorganic base into the buffer solution, further comprising controlling the variation of the pH value of the buffer solution not exceeding a variation range of ±0.5.

5. The method according to claim 4, wherein the step of controlling the pH value of the buffer solution comprises controlling the addition rates of the first solution and the inorganic base into the buffer solution.

6. The method according to claim 1, wherein when mixing the first solution with the buffer solution, further comprising controlling the temperature variation of the buffer solution not exceeding a variation range of ±10° C.

7. The method according to claim 1, wherein an amount of the inorganic zirconium salt in the first solution is between 2~4 mol/L.

8. The method according to claim 1, wherein the inorganic zirconium salt in the first solution is zirconium chloride, zirconium nitrate or zirconyl hydrochloride.

9. The method according to claim 1, wherein the organic acid and the zirconium ions in the first solution have a molar ratio between 0.1~0.25.

10. The method according to claim 1, the buffer solution contains ammonium carbonate.

11. The method according to claim 1, wherein the organic amine in the buffer solution and the zirconium ions in the first solution have a molar ratio between 0.1~0.2.

12. The method according to claim 1, wherein the step of heating the sol is conducted under 90~120° C.

13. The method according to claim 1, wherein the step of heating the sol is conducted for a duration of about 8~24 hours.

14. The method according to claim 1, wherein the product obtained after heating the sol comprises zirconia crystals having an average primary particles size less than 20 nm.

15. The method according to claim 14, wherein the zirconia crystals have an avenge primary particles size between 7~20 nm.

16. The method according to claim 14, wherein the zirconia crystals exist in combined tetragonal and cubic crystal lattice structures.

17. The method according to claim 1, wherein after the step of heating the sol, further comprising the steps of washing and filtering the product.

18. The method according to claim 1, wherein after the step of adjusting the pH of the acidic slurry to form the neutral zirconia sol, further comprising a step of drying the neutral zirconia sol to form a powder.

19. The method according to claim 18, wherein vacuum concentrating or vaporizing method is performed for accomplishing the step of drying the neutral zirconia sol.

20. The method according to claim 18, wherein after the step of drying the neutral zirconia sol to form the powder, further comprising a step of dispersing the powder into a solvent to obtain a transparent dispersion sol.

21. The method according to claim 20, wherein the solvent is selected from one of water, a polar solvent and a mixed solvent thereof.

22. The method according to claim 21, wherein the polar solvent comprises ethanol or ethylene glycol.

* * * * *